United States Patent
Kilgore

[19]
[11] Patent Number: 5,832,649
[45] Date of Patent: Nov. 10, 1998

[54] DECOY MOBILE

[76] Inventor: Charles Kilgore, 6778 Delta Dr., Riverdale, Ga. 30274

[21] Appl. No.: 815,392

[22] Filed: Mar. 11, 1997

[51] Int. Cl.[6] .................................................. A01M 31/06
[52] U.S. Cl. .............................................. 43/2; D22/125
[58] Field of Search ............................... 43/2, 3; D22/125

[56] References Cited

U.S. PATENT DOCUMENTS

| | | | |
|---|---|---|---|
| 1,428,216 | 9/1922 | Chase | 43/2 |
| 1,629,442 | 5/1927 | Geisinger | 43/3 |
| 2,028,849 | 1/1936 | Shay | 43/3 |
| 2,129,781 | 9/1938 | Park | 43/3 |
| 3,186,120 | 6/1965 | Layson | 43/2 |
| 3,768,192 | 10/1973 | Caccamo | 43/2 |
| 4,965,953 | 10/1990 | McKinney | 43/2 |
| 5,168,649 | 12/1992 | Wright | 43/2 |
| 5,199,204 | 4/1993 | Lowery | 43/2 |

*Primary Examiner*—J. Woodrow Eldred

[57] ABSTRACT

A decoy mobile (10) having a mobile spreader (14B) suspended a predetermined distance from the ground by attachment to a fixed object. The decoy mobile (10) further has at least one mobile lower line (14CL, 14CR) attached at an upper end to the mobile spreader (14B). The at least one mobile lower line (14CL, 14CR) is further securely attached to a mobile anchor line (14DL, 14DR) which is securely attached to a mobile anchor line fastener (14DLA, 14DRA). The decoy mobile (10) further has at least one decoy (12L, 12R) securely attached to the at least one mobile lower line (14CL, 14CR). The at least one decoy (12L, 12R) rotates when contacted by wind simulating a real animal.

12 Claims, 4 Drawing Sheets

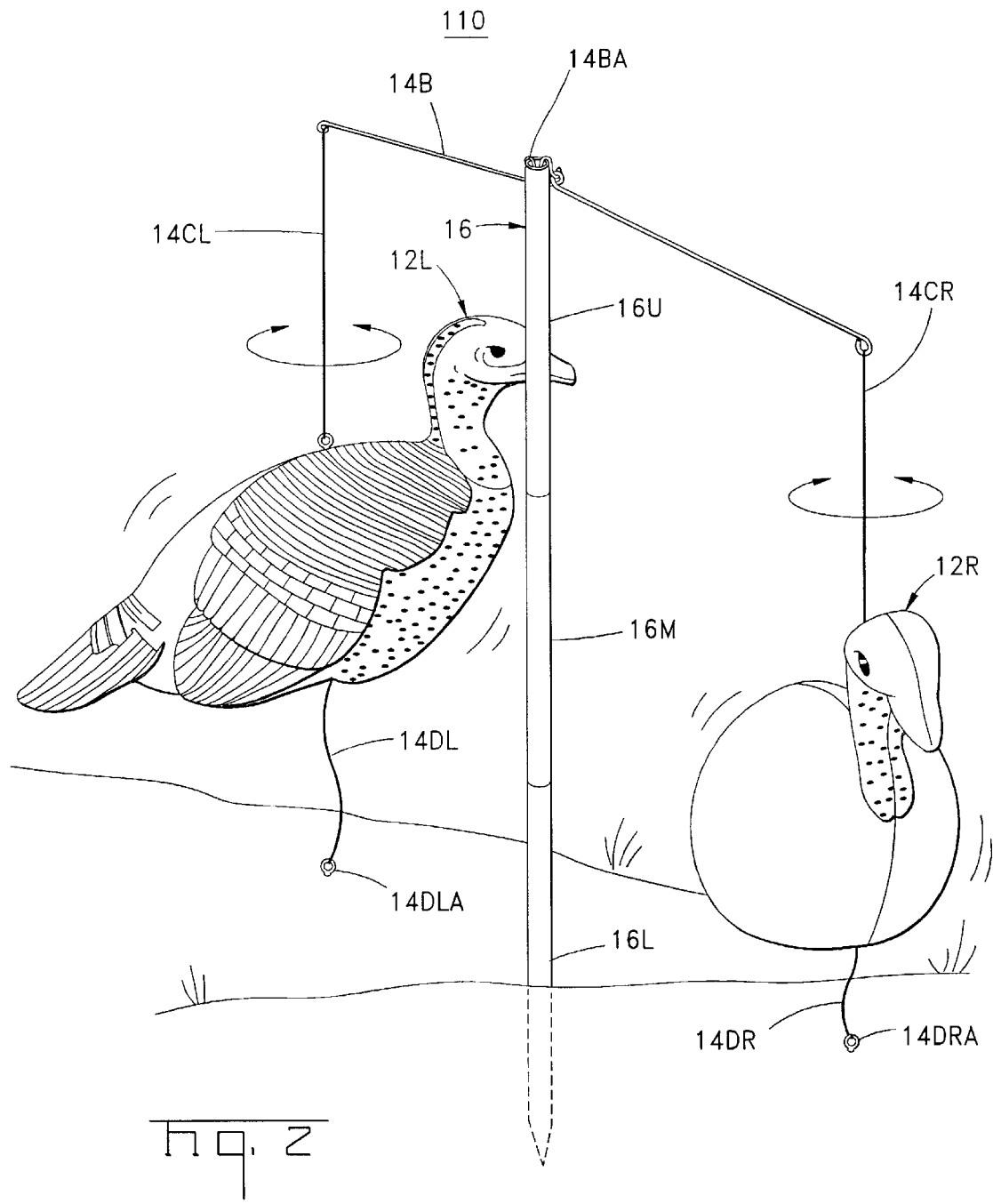

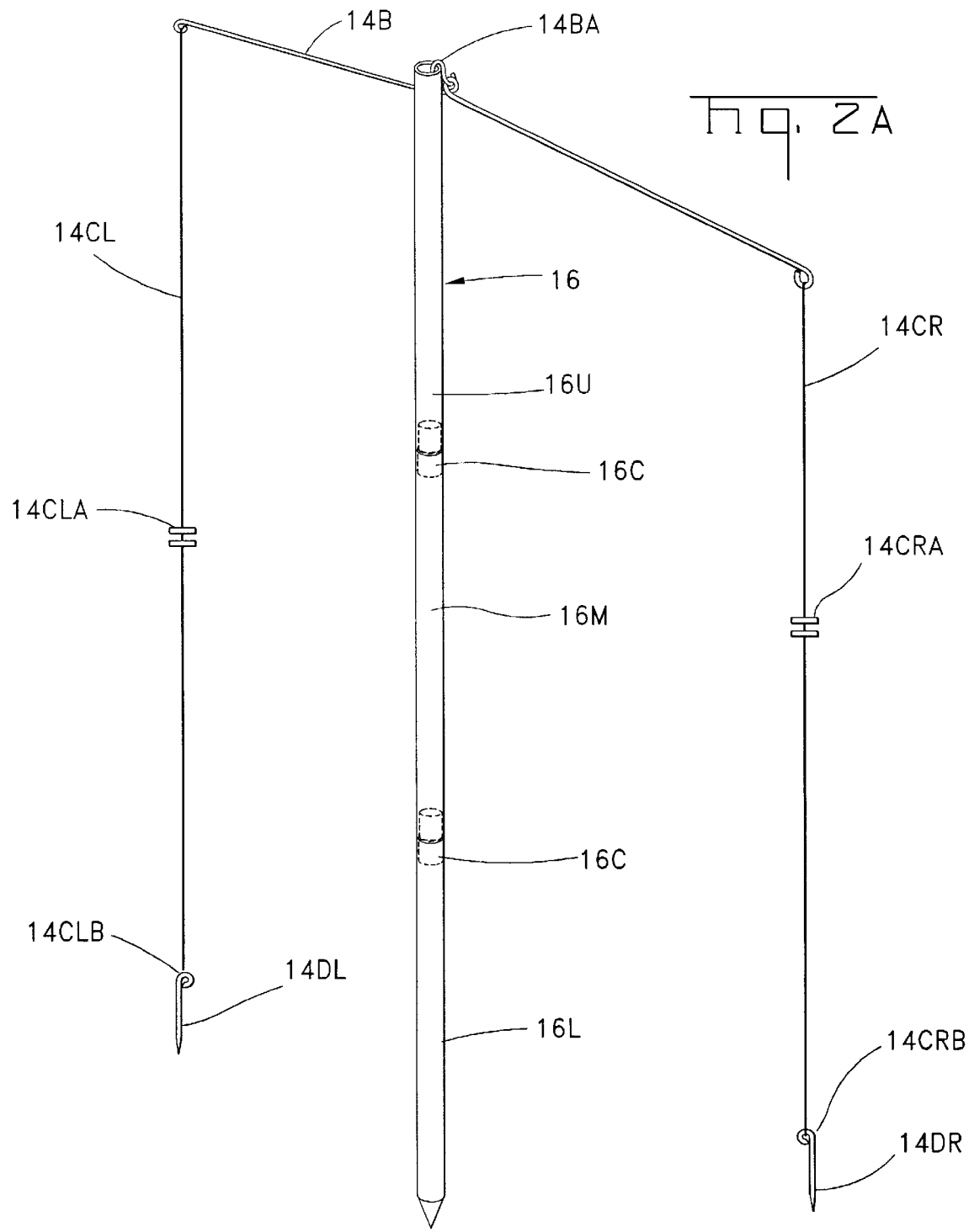

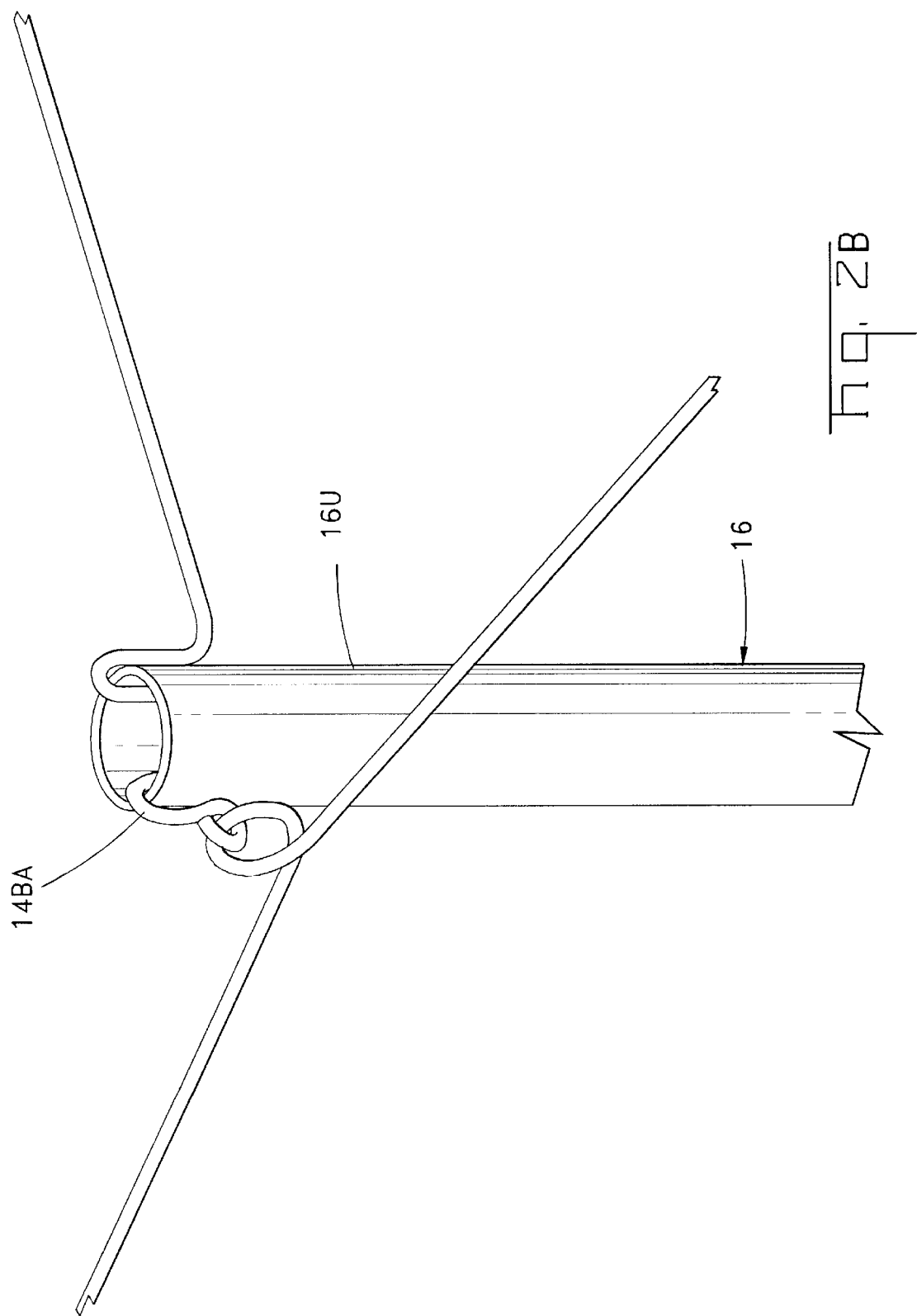

DECOY MOBILE

BACKGROUND OF THE INVENTION

1. Field of the Invention

The present invention relates to hunting decoys. More particularly, the present invention relates to decoy mobiles for turkey hunting.

2. Description of the Prior Art

Numerous innovations for a Decoy Mobile have been provided in the prior art that are described as follows. Even though these innovations may be suitable for the specific individual purposes to which they address, they differ from the present invention as hereinafter contrasted.

In U.S. Pat. No. 5,289,654, titled Animated Wildfowl Decoy, invented by Arthur Denny and William Heaney, an animated decoy simulating the external appearance and certain head and neck movements of a wild turkey. The decoy is essentially hollow, and the neck includes a plurality of interconnected, longitudinal segments. In a first embodiment, the head and neck are pivotally movable in an up and down manner with respect to the body, and the head is movable in a twisting motion with respect to the neck. First and second motors, independently actuatable by an RF transmitter, with appropriate motion transfer linkages, effect movement of the decoy parts. In a second embodiment, a motor is actuatible in response to audible sounds, such as live or simulated turkey call, to effect pivotal up and down movement of the decoy head and neck.

In U.S. Pat. No. 5,199,204, titled Turkey Decoy Kit Apparatus, invented by Lester L. Lowery, a turkey kit assemblage includes a turkey representative figure, including a torso, a tail portion, upwardly and forwardly extending neck and head portion, with simulated wings mounted to the torso. The torso includes a body mount member mounted to a bottom surface of the torso arranged for accommodating various securement members, to include leg members to include spikes, a spring-biased clamp structure, a unitary spike assemblage and the like for mounting to various surfaces and objects. The invention is further arranged to include an elongate malleable spine member directed coextensively from the head through the tail portion of the decoy, and is further arranged to accommodate a scent distribution assemblage for distribution of a scent relative to the torso of the structure.

In U.S. Pat. No. 5,168,649, titled Turkey Decoy, invented by David Wright, a turkey decoy is provided which includes a hen turkey body portion mounted on a support mechanism. The support mechanism is adapted for selective alteration of the position of the hen turkey body portion from a standing position to a position which imitates the mating posture of a hen turkey in order to lure tom turkeys out into a clearing for easier shooting thereof The hen turkey body portion is mounted for selectively causing same to suddenly vertically drop straight downward in a non-pivotal fashion.

In U.S. Pat. No. 4,965,953, titled Remote Controlled Turkey Decoy, invented by Richard H. McKinney, a wild turkey decoy includes a support stand to which the main body member is pivoted. The head and neck member are in turn pivotally connected to the main body member. A spring interconnects the head and neck member to the support stand. A control line extends through guides on the support stand to the head and neck member whereby pull on the control line causes the entire bird to pivot downwardly first to the limit of its pivotal movement followed by the pivoting downwardly of the head and neck member to simulate a bird feeding. An alternate arrangement includes a tie-line extending between the head and neck member to the support stand whereby pull on the control line causes simultaneous pivotal movement of the main body member relative to the support stand and the head and neck member relative to the main body member.

The above described patented inventions differ from the present invention because they lack one or more of the following features: mobile spreader, mobile spreader fastening means, mobile lower line, mobile lower line upper decoy fastening means, mobile lower line lower decoy fastening means, mobile anchor line, mobile anchor line fastener, post, post connector, upper post, middle post, and lower post.

Numerous innovations for decoys have been provided in the prior art that are adapted to be used. Even though these innovations may be suitable for the specific individual purposes to which they address, they would not be suitable for the purposes of the present invention as heretofore described.

SUMMARY OF THE INVENTION

The present invention relates to hunting decoys. More particularly, the present invention relates to decoy mobiles for turkey hunting.

The types of problems encountered in the prior art are unnatural movement, excessive weight and a dependancy on power sources to provide movement.

In the prior art, unsucessful attempts to solve this problem were attempted namely radio controlled movements and manual movements such as pulling a string. The prior art required user involvement to produce motion. Unless the user practiced the motion would appear unrealistic. However, the problem was solved by the present invention because the motion is produced by the wind.

Innovations within the prior art are rapidly being exploited with many sorts of natural looking decoys being inexpensively produced.

The present invention went contrary to the teaching of the art by relaying on a natural source of power to drive the movement.

The present invention solved a long felt need for a inexpensive realistic decoy with unattended movement.

Accordingly, it is an object of the present invention to provide realistic decoy which moves unattended.

More particularly, it is an object of the present invention to provide realistic decoy.

In keeping with these objects, and with others which will become apparent hereinafter, one feature of the present invention resides, briefly stated, in the motion of several fowl is simulated by wind pushing the decoys which are suspended from opposite ends of a cantilevered beam.

When the decoy mobile is designed in accordance with the present invention, a realistic decoy is produced which has an unattended natural movement.

In accordance with another feature of the present invention, the decoys are light weight and do not require complex machinery to create a natural motion.

Another feature of the present invention is that a balanced beam support two decoys on opposite ends. Each decoy is constrained vertically but permitted to rotate individually and revolve about a the suspension point of the overhead beam.

Yet another feature of the present invention is that the decoys are suspended from the ends of the overhead beam via invisible monofilament line.

Still another feature of the present invention is that ?the decoys are suspended so that wind currents cause the decoys to bob and weave in a natural way.

Yet still another feature of the present invention is that a mobile spreader may be supported from a post in area where there are no overhead tree limbs.

The novel features which are considered characteristic for the invention are set forth in the appended claims. The invention itself however, both as to its construction and its method of operation, together with additional objects and advantages thereof, will be best understood from the following description of the specific embodiments when read and understood in connection with the accompanying drawings.

BRIEF LIST OF REFERENCE NUMERALS UTILIZED IN THE DRAWING

10—decoy mobile (10)
12L—left decoy (12L)
12R—right decoy (12R)
14A—mobile upper line (14A)
14AA—mobile upper line fastening means (14AA)
14B—mobile spreader (14B)
14BA—mobile spreader fastening means (14BA)
14CL—mobile left lower line (14CL)
14CLA—mobile left lower line upper decoy fastening means (14CLA)
14CLB—mobile left lower line lower decoy fastening means (14CLB)
14DL—mobile left anchor line (14DL)
14DLA—mobile left anchor line fastener (14DLA)
14CR—mobile right lower line (14CR)
14CRA—mobile right lower line upper decoy fastening means (14CRA)
14CRB—mobile right lower line lower decoy fastening means (14CRB)
14DR—mobile right anchor line (14DR)
14DRA—mobile right anchor line fastener (14DRA)
16—post (16)
16C—post connector (16C)
16U—upper post (16U)
16M—middle post (16M)
16L—lower post (16L)
18—tree (18)

BRIEF DESCRIPTION OF THE DRAWING

FIG. 2 is a side view of a decoy mobile suspended from a post.

FIG. 2A is a side view of a mobile spreader suspended from a post.

FIG. 2B is a top perspective view of a upper post exhibiting a mobile spreader fastening means attached thereto.

DESCRIPTION OF THE PREFERRED EMBODIMENT

Figure 1:
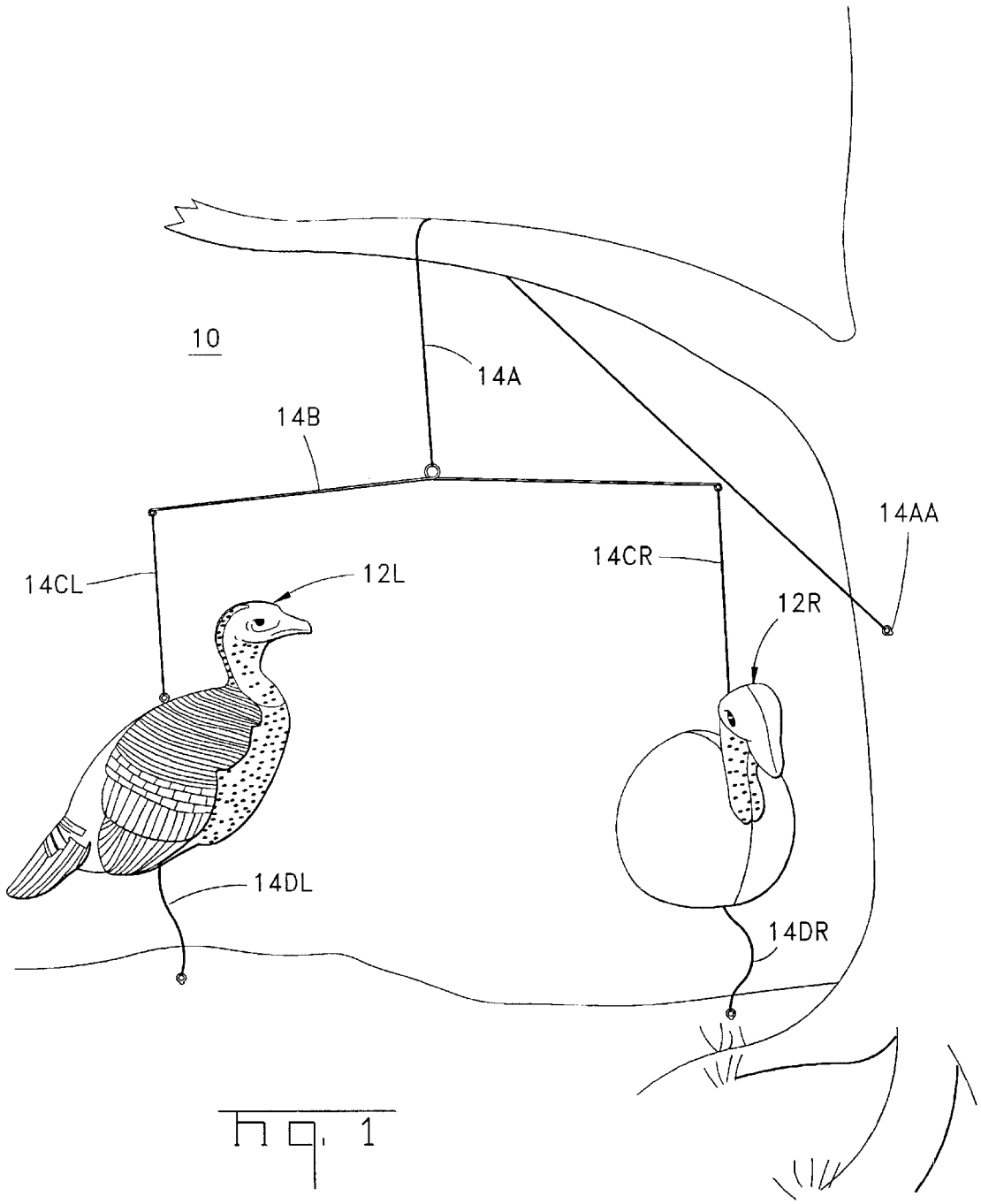
FIG. 1 is a perspective view of a decoy mobile suspended from a tree.

Referring to FIG. 1 which is a perspective view of a decoy mobile (10) suspended from a tree (18). The decoy mobile (10) comprises a mobile spreader (14B) suspended a predetermined distance from the ground by attachment to a fixed object. The mobile spreader (14B) is preferably manufactured from a material selected from a group consisting of metal, metal alloy, rubber, rubber composites, plastic, plastic composites, epoxy, fiberglass, and carbon-graphite. The decoy mobile (10) further comprises at least one mobile lower line (14CL, 14CR) attached at an upper end to the mobile spreader (14B). The at least one mobile lower line (14CL, 14CR) is further securely attached to a mobile anchor line (14DL, 14DR) which is securely attached to a mobile anchor line fastener (14DLA, 14DRA). The decoy mobile (10) further comprises at least one decoy (12L, 12R) is securely attached to the at least one mobile lower line (14CL, 14CR). The at least one decoy (12L, 12R) rotates when contacted by wind simulating a real animal. The fixed object is preferably a tree (18) and the mobile spreader (14B) is securely attached to a mobile upper line (14A) which is securely attached to a mobile upper line fastening means (14AA). The mobile upper line (14A) is preferably manufactured from a transparent or translucent material.

Referring to FIG. 2, FIG. 2A, and FIG. 2B which are a side view of a decoy mobile (10) suspended from a post (16), a side view of a mobile spreader (14B) suspended from a post (16), and a top perspective view of a upper post (16U) exhibiting a mobile spreader fastening means (14BA) attached thereto. In another embodiment, the fixed object is a post (16) securely mounted into a ground and the mobile spreader (14B) is attached to an upper post (16U) by a mobile spreader fastening means (14BA). The post (16) may optionally further comprises a lower post (16L), having a pointed end, which is attached to the upper post (16U) by a post connector (16C). The post (16) may optionally further comprises at least one middle post (16M) securely mounted between the upper post (16U) by a post connector (16C) and the lower post (16L) by a post connector (16C).

The mobile left lower line (14CL) comprises a mobile left lower line upper decoy fastening means (14CLA) attachable to a top of the at least one decoy (12L, 12R) and a lower decoy fastening means (14CLB) attachable to a bottom of the at least one decoy (12L, 12R). The at least one decoy (12L, 12R) are preferably a pair consisting of a left decoy (12L) and a right decoy (12R). The left decoy (12L) is securely attached to the mobile left lower line (14CL) which is securely attached to at a top distal end to a left distal end of the mobile spreader (14B). The mobile left lower line (14CL) is securely attached at a bottom distal end to a top distal end of a mobile left anchor line (14DL) which is securely attached at a bottom distal end to a mobile left anchor line fastener (14DLA) mounted in the ground. The right decoy (12R) is securely attached to the mobile right lower line (14CR) which is securely attached to at a top distal end to a right distal end of the mobile spreader (14B). The mobile right lower line (14CR) is securely attached at a bottom distal end to a top distal end of a mobile right anchor line (14DR) which is securely attached at a bottom distal end to a mobile right anchor line fastener (14DRA) mounted in the ground. The mobile right lower line (14CR) further comprises a mobile right lower line upper decoy fastening means (14CRA) attachable to a top of the right decoy (12R) and a mobile right lower line lower decoy fastening means (14CRB) attachable to a bottom of the right decoy (12R). The mobile left lower line (14CL), mobile left anchor line (14DL), mobile right lower line (14CR), and mobile right anchor line (14DR) are manufactured from a transparent or translucent material.

It will be understood that each of the elements described above, or two or more together, may also find a useful application in other types of constructions differing from the type described above.

While the invention has been illustrated and described as embodied in a decoy, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. A decoy mobile (10) comprising:
   A) a mobile spreader (14B) suspended a pre-determined distance from the ground by attachment to a fixed object;
   B) at least one mobile lower line (14CL, 14CR) attached at an upper end to the mobile spreader (14B), the at least one mobile lower line (14CL, 14CR) is further securely attached to a mobile anchor line (14DL, 14DR) which is securely attached to a mobile anchor line fastener (14DLA, 14DRA);
   C) at least one decoy (12L, 12R) is securely attached to the at least one mobile lower line (14CL, 14CR), the at least one decoy (12L, 12R) rotates when contacted by wind simulating a real animal.

2. The decoy mobile (10) as described in claim 1, wherein the fixed object is a tree (18) and the mobile spreader (14B) is securely attached to a mobile upper line (14A) which is securely attached to a mobile upper line fastening means (14AA).

3. The decoy mobile (10) as described in claim 1, wherein the fixed object is a post (16) securely mounted into a ground and the mobile spreader (14B) is attached to an upper post (16U) by a mobile spreader fastening means (14BA).

4. The decoy mobile (10) as described in claim 3, wherein the post (16) further comprises a lower post (16L), having a pointed end, which is attached to the upper post (16U) by a post connector (16C).

5. The decoy mobile (10) as described in claim 4, wherein the post (16) further comprises at least one middle post (16M) securely mounted between the upper post (16U) by a post connector (16C) and the lower post (16L) by a post connector (16C).

6. The decoy mobile (10) as described in claim 1, wherein the mobile left lower line (14CL) comprises a mobile left lower line upper decoy fastening means (14CLA) attachable to a top of the at least one decoy (12L, 12R) and a lower decoy fastening means (14CLB) attachable to a bottom of the at least one decoy (12L, 12R).

7. The decoy mobile (10) as described in claim 1, wherein the at least one decoy (12L, 12R) are a pair consisting of a left decoy (12L) and a right decoy (12R).

8. The decoy mobile (10) as described in claim 7, wherein the left decoy (12L) is securely attached to the mobile left lower line (14CL) which is securely attached to at atop distal end to a left distal end of the mobile spreader (14B), the mobile left lower line (14CL) is securely attached at a bottom distal end to a top distal end of a mobile left anchor line (14DL) which is securely attached at a bottom distal end to a mobile left anchor line fastener (14DLA) mounted in the ground, the right decoy (12R) is securely attached to the mobile right lower line (14CR) which is securely attached to at a top distal end to a right distal end of the mobile spreader (14B), the mobile right lower line (14CR) is securely attached at a bottom distal end to a top distal end of a mobile right anchor line (14DR) which is securely attached at a bottom distal end to a mobile right anchor line fastener (14DRA) mounted in the ground.

9. The decoy mobile (10) as described in claim 8, wherein the mobile right lower line (14CR) further comprises a mobile right lower line upper decoy fastening means (14CRA) attachable to a top of the right decoy (12R) and a mobile right lower line lower decoy fastening means (14CRB) attachable to a bottom of the right decoy (12R).

10. The decoy mobile (10) as described in claim 8, wherein the mobile left lower line (14CL), mobile left anchor line (14DL), mobile right lower line (14CR), and mobile right anchor line (14DR) are manufactured from a transparent or translucent material.

11. The decoy mobile (10) as described in claim 2, wherein the mobile upper line (14A) is manufactured from a transparent or translucent material.

12. The decoy mobile (10) as described in claim 1, wherein the mobile spreader (14B) is manufactured from a material selected from a group consisting of metal, metal alloy, rubber, rubber composites, plastic, plastic composites, epoxy, fiberglass, and carbon-graphite.

* * * * *